US009649994B2

(12) United States Patent
Masuda

(10) Patent No.: US 9,649,994 B2
(45) Date of Patent: May 16, 2017

(54) MOLDING

(71) Applicant: FALTEC Co., Ltd., Kanagawa-ken (JP)

(72) Inventor: Reiji Masuda, Kanagawa-ken (JP)

(73) Assignee: FALTEC CO., LTD., Kanagawa-ken (JP)

( * ) Notice: Subject to any disclaimer, the term of this patent is extended or adjusted under 35 U.S.C. 154(b) by 0 days.

(21) Appl. No.: 15/043,791

(22) Filed: Feb. 15, 2016

(65) Prior Publication Data

US 2016/0236629 A1 Aug. 18, 2016

(30) Foreign Application Priority Data

Feb. 17, 2015 (JP) ................................ 2015-028501

(51) Int. Cl.
| | | |
|---|---|---|
| B60J 1/16 | (2006.01) | |
| B60R 13/04 | (2006.01) | |
| B60J 10/16 | (2016.01) | |
| B60J 10/235 | (2016.01) | |
| B60J 10/265 | (2016.01) | |
| B60J 10/70 | (2016.01) | |

(52) U.S. Cl.
CPC .............. B60R 13/04 (2013.01); B60J 10/16 (2016.02); B60J 10/235 (2016.02); B60J 10/265 (2016.02); B60J 10/70 (2016.02)

(58) Field of Classification Search
CPC .......... B60R 13/0243; B60R 2013/0281; B60J 10/16; B60J 10/70; B60J 10/235
See application file for complete search history.

(56) References Cited

U.S. PATENT DOCUMENTS

| | | | | | |
|---|---|---|---|---|---|
| 2,464,406 | A | * | 3/1949 | Kramer | ................... B60J 10/75 49/377 |
| 3,742,649 | A | * | 7/1973 | Dochnahl | ............... B60J 10/75 49/441 |
| 5,353,549 | A | * | 10/1994 | Henderson | ............... B60J 10/75 49/377 |
| 5,561,003 | A | * | 10/1996 | Nowosiadly | ........ B60R 13/0206 296/93 |
| 6,128,859 | A | * | 10/2000 | Vance | .................... B60J 10/265 49/377 |

(Continued)

FOREIGN PATENT DOCUMENTS

| | | |
|---|---|---|
| CN | 202294598 U | 7/2012 |
| JP | 2003118386 A | 4/2003 |

(Continued)

OTHER PUBLICATIONS

Extended European Search Report dated Jul. 8, 2016 for Application No. 16155678.2.

*Primary Examiner* — Brian Mattei
*Assistant Examiner* — Gisele Ford
(74) *Attorney, Agent, or Firm* — Moser Taboada

(57) ABSTRACT

A molding includes: a long molding body; and an endcap closing an end surface of the molding body. Also, the molding body includes: a base part composed of a plurality of dividing parts that are separated from one another and arranged in an extending direction of the molding body; and an edge part having higher elasticity than the elasticity of the base part and connected to an edge of the base part over the plurality of the dividing parts.

4 Claims, 9 Drawing Sheets

(56) References Cited

U.S. PATENT DOCUMENTS

| | | | | |
|---|---|---|---|---|
| 7,171,785 B1* | 2/2007 | Kelly | ................... | B60J 10/235 49/377 |
| 8,001,727 B2* | 8/2011 | Ho | ................... | B29C 45/14467 49/374 |
| 8,549,790 B2* | 10/2013 | Murree | ................... | B60J 10/75 49/377 |
| 2009/0151266 A1* | 6/2009 | Shumulinskiy | ........ | B60J 10/365 49/489.1 |
| 2011/0204671 A1* | 8/2011 | Baratin | ............... | B60J 10/0051 296/93 |
| 2012/0228448 A1* | 9/2012 | Jabra | ................... | B60J 10/0022 248/221.11 |
| 2013/0097962 A1* | 4/2013 | Yoshida | ................. | B60R 13/04 52/716.5 |

FOREIGN PATENT DOCUMENTS

| | | |
|---|---|---|
| JP | 2008018895 A | 1/2008 |
| JP | 2009190621 A | 8/2009 |

* cited by examiner

MOLDING

CROSS-REFERENCE TO RELATED APPLICATIONS

This application claims the benefit of Japanese Patent Application No. 2015-028501 filed on Feb. 17, 2015, and the contents of which are incorporated by reference herein.

BACKGROUND

Field of the Invention

The present invention relates to a molding.

Description of the Related Art

To a vehicle, a molding such as an outside molding (also referred to as a waist molding or a beltline molding) has been conventionally attached. Such a molding includes a long molding body and an endcap attached to an end of the molding body as described in JP 2008-18895 A, for example. In addition, Japanese Unexamined Patent Application First Publication No. 2009-190621 discloses a molding body including a core material formed from a stainless steel or the like (a body 120 in Japanese Unexamined Patent Application First Publication No. 2009-190621), a lip that is fixed to the core material and formed from a resin, and the like. Such a molding body including a core material, a lip and the like that are integrated is typically formed by extrusion molding, and upon molding the core material, the lip and the like made of a resin is formed integrally with the core material at the same time. The integrally formed molding body is then cut to a predetermined length, and curved along the contour of the vehicle body by a bending process.

When the core material needs to be curved in the extending direction, the lip and the like made of a resin may not be integrally formed upon molding the core material in some cases. Therefore, when the core material has to be largely curved, a part formed from a stainless steel (metal component) and a part formed from a resin (resin component) are molded separately, and they are then assembled in a sequential process.

When the metal component and the resin component are individually formed, dimensional errors appearing in respective components may cause a difference in length between the metal component and the resin component. When such a difference is caused, a cap of the endcap may abut against the metal component, and the abutment may lead to a gap generated between the cap and the resin component, for example. In other words, in the conventional molding, a gap may be generated between the endcap and the molding body when the molding body is largely curved.

The present invention has been achieved in view of the problems described above, and an object thereof is to prevent generation of a gap between an endcap and a molding body in a molding to be mounted on a vehicle.

SUMMARY

The present invention employs a configuration to be described below as means for solving the problems.

A molding according to an aspect of the present invention includes: a long molding body; and an endcap closing an end surface of the molding body. Also, the molding body includes: a base part composed of a plurality of dividing parts that are separated from one another and arranged in an extending direction of the molding body; and an edge part having higher elasticity than the elasticity of the base part and connected to an edge of the base part over the plurality of the dividing parts.

The molding according to the aspect may further include a stretching part between the dividing parts, the stretching part being fixed to ends of the dividing parts and are formed from a material having a higher elasticity than the elasticity of the base part.

The stretching part may be formed from the same material as the material of the edge part and is provided integrally with the edge part.

The base part may include a lock part that is at a position closer to an end of the molding body than the stretching part and that is locked with the endcap from a position that is close to the end.

According to the above-described aspect of the present invention, the molding body is connected to the base part and the edge of the base part, and the molding body includes the edge part having an elasticity higher than the base part. The molding body of this type has a configuration, in which the base part having a lower elasticity than the elasticity of the edge part serves as a core material, and the edge part having a high elasticity is attached to the edge of the core material. In addition, in the above-described aspect of the present invention, the base part, which serves as the core material, is composed of the plurality of dividing parts, which are separated from one another and arranged in the extending direction of the molding body. Because of this configuration, stretching the edge part by pulling it separates the dividing parts, which compose the base part, from one another. Thus, the length of the molding body can be adjusted. As a result, according to the above-described aspect of the present invention, the length of the molding body can be adjusted such that no gap is formed between the molding body and the endcap. Consequently, according to the above-described aspect of the present invention, generation of a gap between the endcap and the molding body can be prevented in the molding to be mounted on a vehicle.

DETAILED DESCRIPTION

Figure 1:
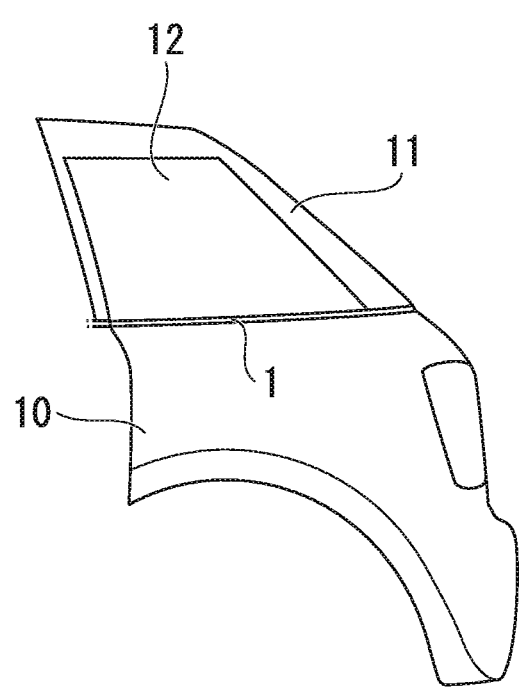
FIG. 1 is a partial enlarged view of a rear quarter of a vehicle on which an outside molding according to an embodiment of the present invention is mounted.

A molding according to an embodiment of the present invention will be described below with reference to the accompanying drawings.

In the drawings, the scales of individual members are appropriately changed to show them in recognizable sizes.

FIG. 1 is a partial enlarged view of a rear quarter of a vehicle on which an outside molding 1 (molding) according to the present embodiment is mounted. As shown in FIG. 1, in the rear quarter of the vehicle, a rear quarter panel 10, a window frame 11, a window pane 12, and the outside molding 1 are mounted. The rear quarter panel 10 is an exterior panel of the vehicle and is a strength member made of a steel sheet. The rear quarter panel 10 is formed with an opening. In the opening, the window frame 11 is fitted. The window frame 11 is fitted in the opening of the rear quarter panel 10, and formed from a resin, for example. The window pane 12 is a fixed window fitted in the window frame 11.

Figure 2:
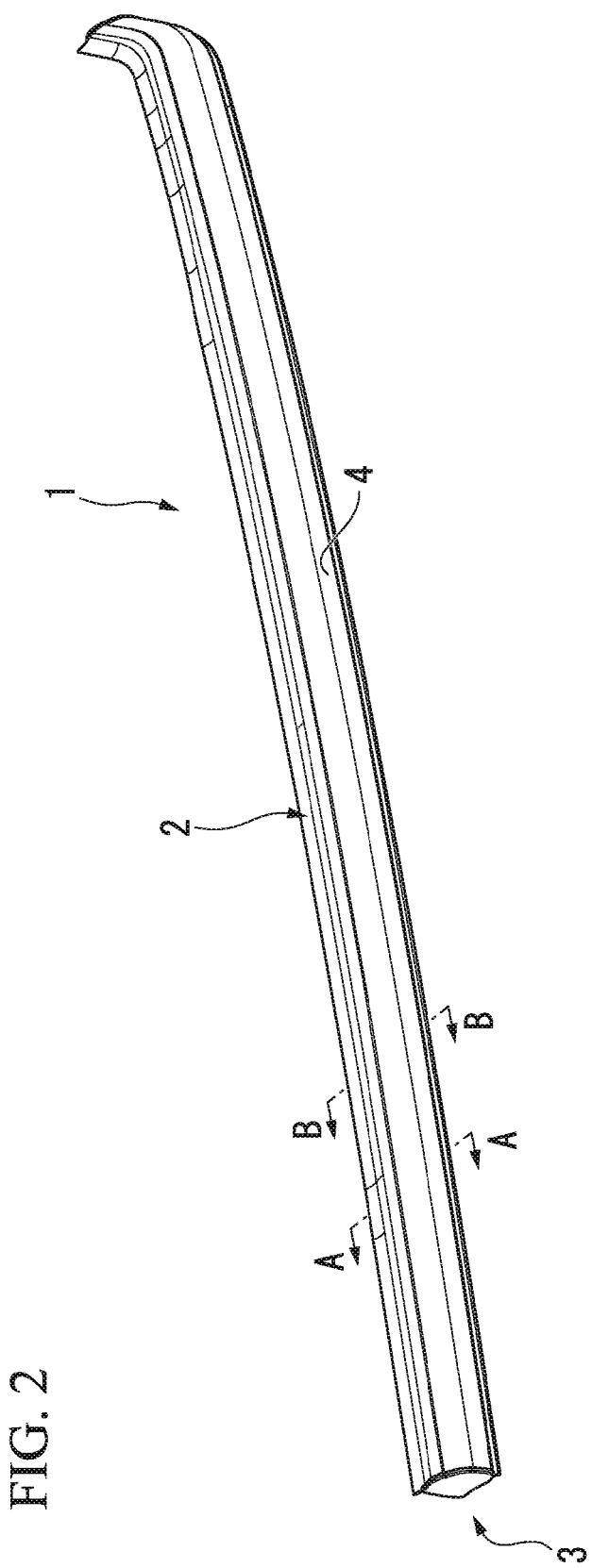
FIG. 2 is a perspective view of the outside molding according to the embodiment of the present invention.
Figure 3:
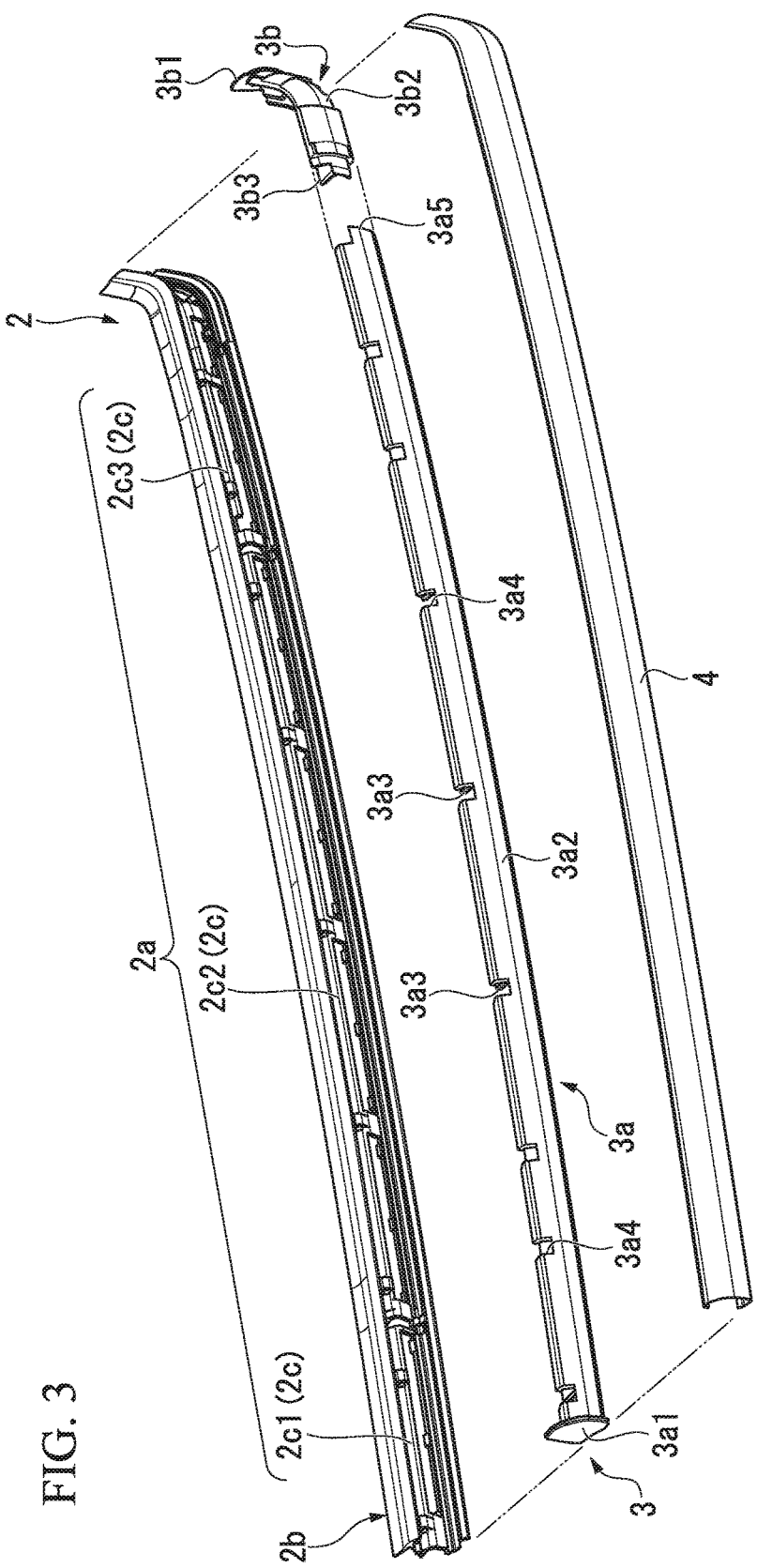
FIG. 3 is an exploded perspective view of the outside molding according to the embodiment of the present invention.

The outside molding 1 according to the present embodiment is mounted to extend in the longitudinal direction of the vehicle (the left and right direction of FIG. 1) along the lower edge of the opening in the rear quarter panel 10. The outside molding 1 is positioned to fill a gap between the rear quarter panel 10 and the window frame 11 or a gap between the rear quarter panel 10 and the window pane 12. The outside molding 1 of the present embodiment will be hereinafter described in detail with reference to FIGS. 2 to 9. FIG. 2 is a perspective view of the outside molding 1 according to the present embodiment. FIG. 3 is an exploded perspective view of the outside molding 1 according to the present embodiment.

As shown in FIGS. 2 to 9, the outside molding 1 according to the present embodiment has a long shape with the end thereof on the rear side of the vehicle (the right side in FIG. 2 and FIG. 3) curved toward the inside of the vehicle. The outside molding 1 includes a long end rubber 2 (the molding body), an endcap 3 closing an end surface of the end rubber 2, and a stainless steel cover 4 covering the end rubber 2 and the endcap 3.

Figure 4:
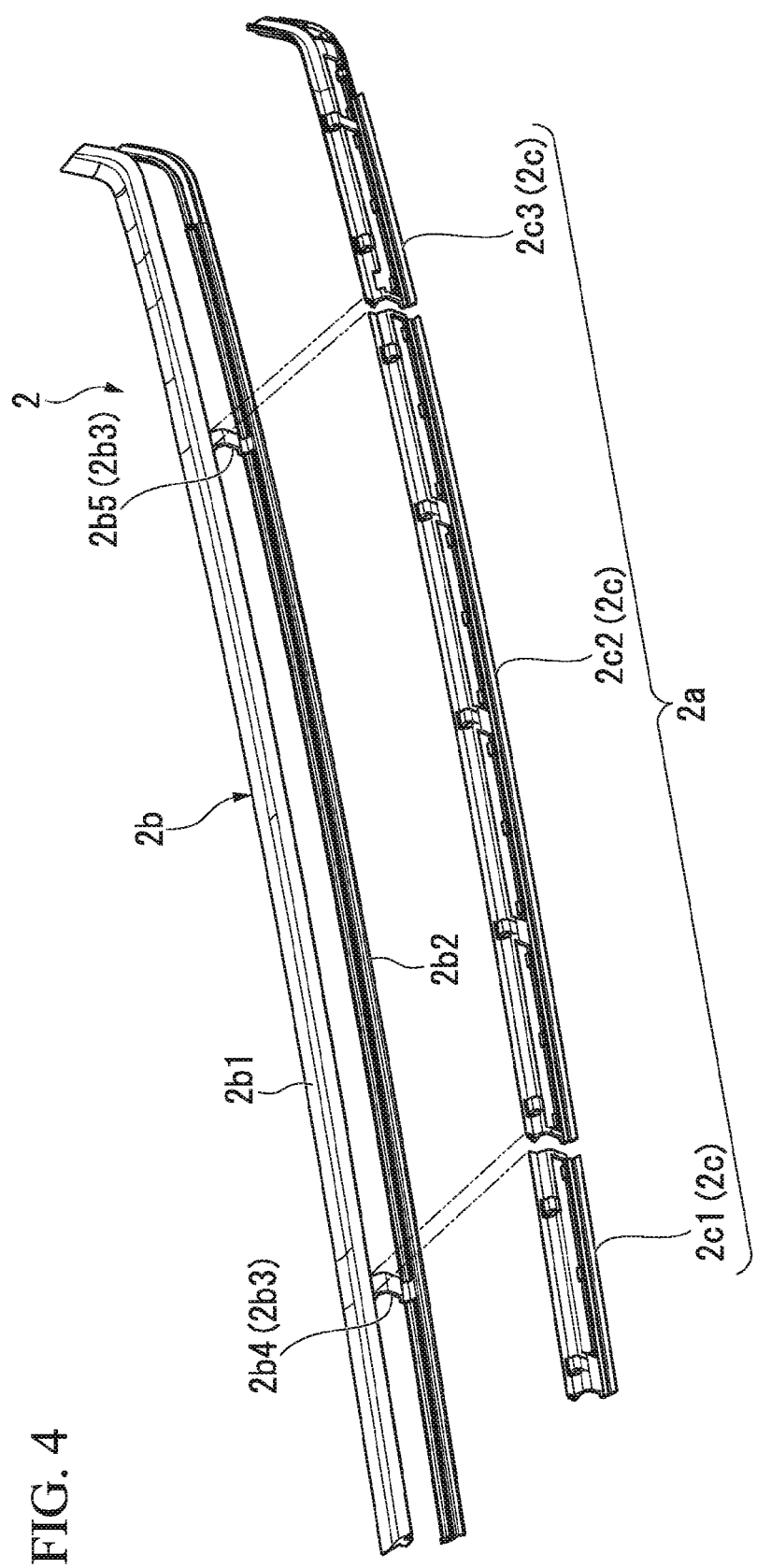
FIG. 4 is an exploded perspective view of an end rubber included in the outside molding according to the embodiment of the present invention.
Figure 5:
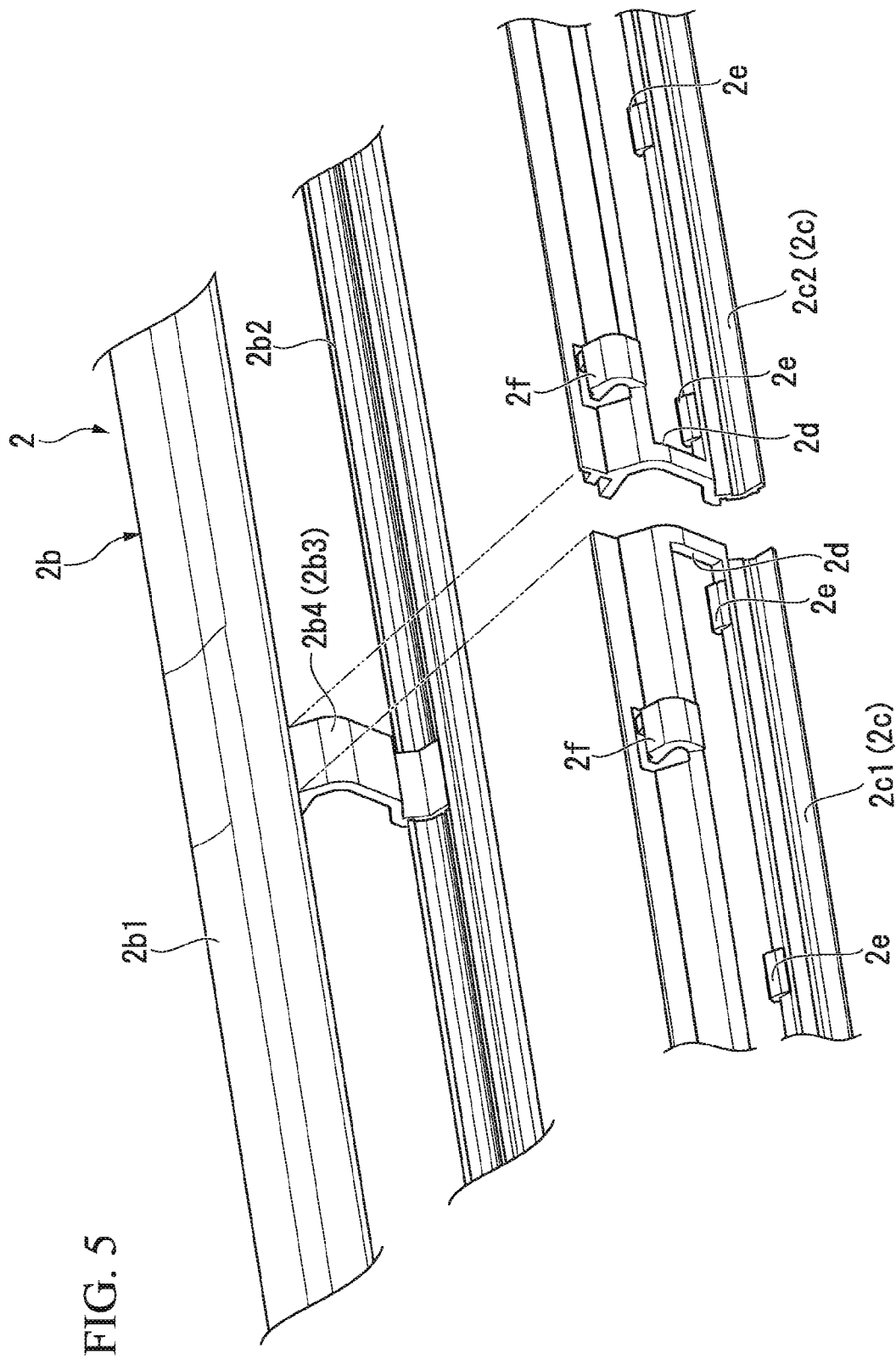
FIG. 5 is an exploded enlarged perspective view of a part of the end rubber included in the outside molding according to the embodiment of the present invention, the part including a stretching part.

FIG. 4 is an exploded perspective view of the end rubber 2. FIG. 5 is an enlarged exploded perspective view of a part of the end rubber 2, the part including one of stretching parts $2b3$ to be described later. As shown in FIG. 4, the end rubber 2 includes a base part $2a$ and a rubber part $2b$ (the edge part). The base part $2a$ is divided into three dividing parts $2c$ arranged in the extending direction of the end rubber 2. The dividing parts $2c$ are formed from ABS resin, ASA resin, or the like and have lower elasticity than the elasticity of the rubber part $2b$. Thus, the dividing parts $2c$ are portions serving as a core of the outside molding 1. Each of the dividing parts $2c$ is formed with an opening(s) $2d$ as shown in FIG. 5. Through the opening $2d$, a lip $3a3$ or a lip $3b3$ of the endcap 3, which will be described later, are to be inserted. As shown in FIG. 5, each of the dividing parts $2c$ includes claw parts $2e$ formed along the lower edge of the opening $2d$ and projecting parts $2f$ formed along the upper edge of the opening $2d$. Each of the claw parts $2e$ is locked from the lower side of the lip $3a3$ or the lip $3b3$ of the endcap 3 (refer to FIG. 9). The projecting parts $2f$ are portions to be inserted into cutouts $3a4$ formed in a base $3a2$ of the endcap 3 to be described later to position the end rubber 2 and the endcap 3 with respect to each other.

Hereinafter, one of the three dividing parts $2c$ positioned on the front side of the vehicle (the left side of FIG. 3) is referred to as a front-side part $2c1$, one of the dividing parts $2c$ positioned in the middle is referred to as a middle part $2c2$, and one of the dividing parts $2c$ positioned on the rear side of the vehicle (the right side of FIG. 3) is referred to as a rear-side part $2c3$.

The front-side part $2c1$ and the middle part $2c2$ are arranged with a certain gap therebetween.

In the gap formed between the front-side part $2c1$ and the middle part $2c2$, one of the stretching parts $2b3$ of the end rubber 2 is inserted. Please note that the end of the front-side part $2c1$ and the stretching part $2b3$ are fixed to each other. In addition, the ends of the middle part $2c2$ are fixed to the respective stretching parts $2b3$. The rear-side part $2c3$ and the middle part $2c2$ are also arranged with a certain gap therebetween. In the gap formed between the rear-side part $2c3$ and the middle part $2c2$, the other of the stretching part $2b3$ of the end rubber 2 is inserted. Please note that the end of the rear-side part $2c3$ and the stretching part $2b3$ are fixed to each other.

Figure 6:
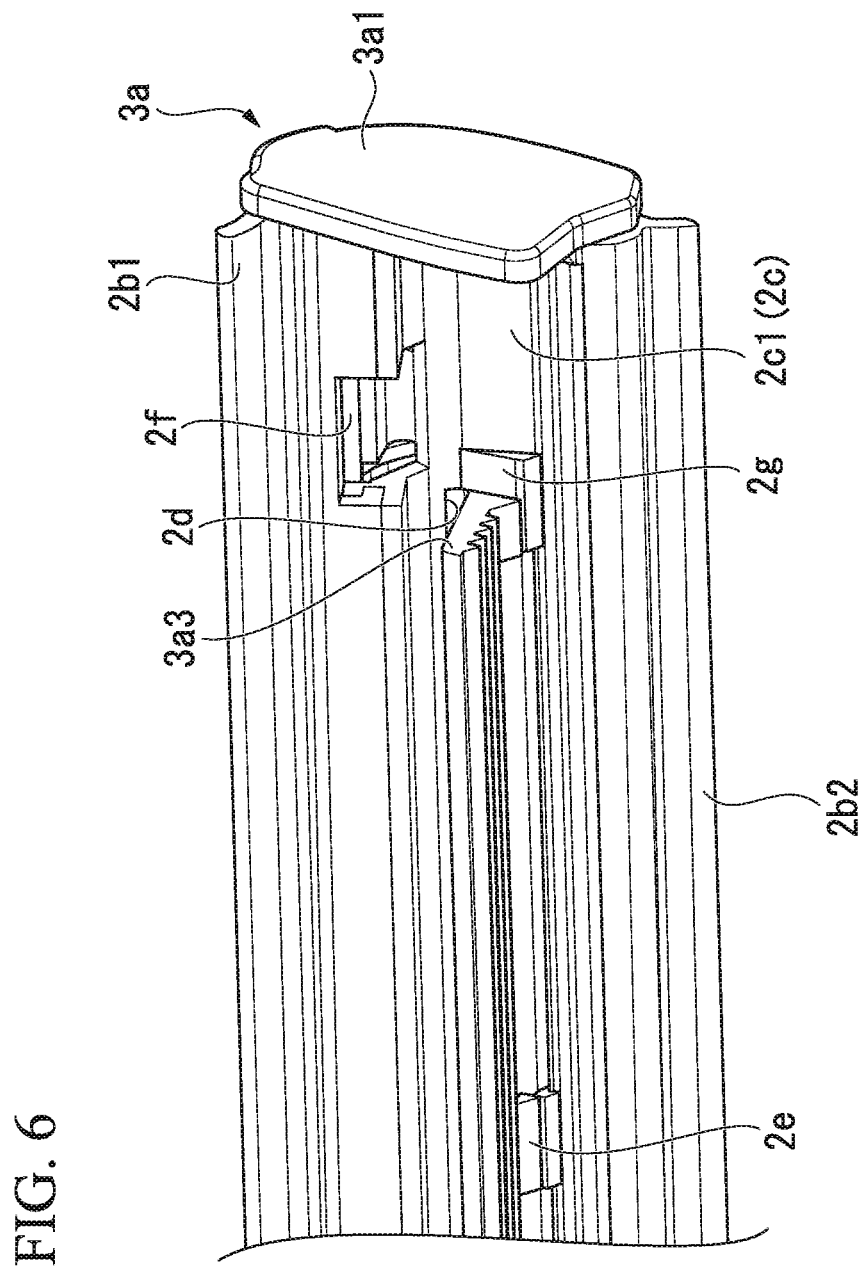
FIG. 6 is a perspective view of the front-side end surface of the outside molding according to the embodiment of the present invention seen from the back surface side.

FIG. 6 is a perspective view of the front-side end of the outside molding 1 according to the present embodiment seen from the back side (the inside of the vehicle). As shown in FIG. 6, the front-side part $2c1$ includes a lock part $2g$, which abuts against the lip $3a3$ of the endcap 3 from the front side (the right side of FIG. 6). The lock part $2g$ is provided on a side edge part of the opening $2d$ in the front-side part $2c1$ and includes a projection projecting toward the inside of the vehicle. The lock part $2g$ is made to abut the side surface of the lip $3a3$ of the endcap 3 from the side of a cap $3a1$ of the endcap 3 to be described later.

Figure 7:
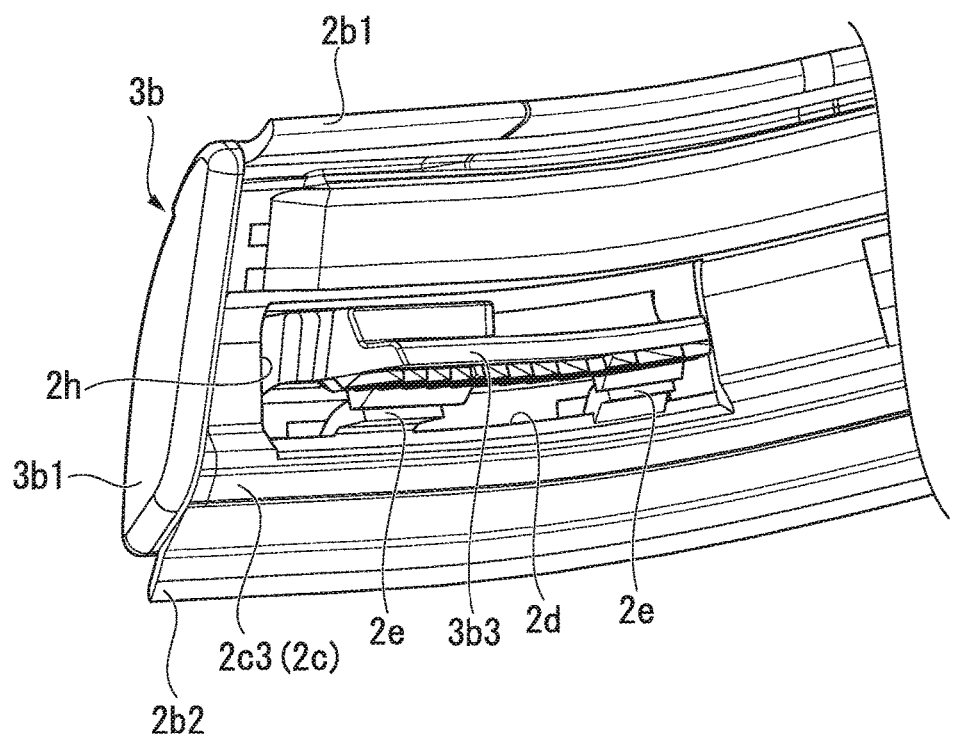
FIG. 7 is a perspective view of the rear-side end surface of the outside molding according to the embodiment of the present invention seen from the back surface side.

FIG. 7 is a perspective view of the rear-side end of the outside molding 1 according to the present embodiment seen from the back side (the inside of the vehicle). As shown in FIG. 7, the rear-side part $2c3$ includes a lock part $2h$, which abuts against the lip $3b3$ of the endcap 3 from the rear side (the left side of FIG. 7). The lock part $2h$ is a side edge part of the opening $2d$ in the rear-side part $2c3$. The lock part $2h$ is made to abut against a side surface of the lip $3b3$ of the endcap 3 from the side of a cap $3b1$ of the endcap 3.

With reference again to FIG. 4, the rubber part $2b$ is formed from a synthetic rubber or the like and has higher elasticity than the elasticity of the base part $2a$. Specifically, the Young's modulus of the rubber part $2b$ is set to be lower than the Young's modulus of the base part $2a$. The rubber part $2b$ includes an upper lip $2b1$, a lower lip $2b2$, and the stretching parts $2b3$. The upper lip $2b1$ forms the upper edge part of the end rubber 2 and is a long portion arranged along the longitudinal direction of the vehicle. The lower lip $2b2$ forms the lower edge of the end rubber 2 and is a long portion arranged along the longitudinal direction of the vehicle. The upper lip $2b1$ and the lower lip $2b2$ are arranged in parallel, have the same length, and are connected by the stretching parts $2b3$. The upper lip $2b1$ is fixed to the upper ends of all of the three dividing parts $2c$, which compose the base part $2a$ (that is, the upper edge of the base part $2a$). The lower lip $2b2$ is fixed to the lower end of all of the three dividing parts $2c$, which compose the base part $2a$ (that is, the lower edge of the base part $2a$). In other words, the upper lip $2b1$ and the lower lip $2b2$ (that is, the rubber part $2b$) are connected to the edge of the base part $2a$ over the plurality of parts $2c$ of the base part $2a$. The upper lip $2b1$ and the lower lip $2b2$ are portions that abut against the window frame 11 or the window pane 12 when the outside molding 1 is mounted on the vehicle.

The stretching parts $2b3$ are provided at two parts on the front side and the rear side of the vehicle. Each of the stretching parts $2b3$ connects the upper lip $2b1$ and the lower lip $2b2$. One of the stretching part $2b3$ provided on the front side (to be hereinafter referred to as a front-side stretching part $2b4$) is positioned between the front-side part $2c1$ and the middle part $2c2$ included in the base part $2a$. The other of the stretching part $2b3$ provided on the rear side (to be hereinafter referred to as a rear-side stretching part $2b5$) is positioned between the rear-side part 2c3 and the middle part 2c2 included in the base part 2a.

The rubber part 2b has higher elasticity than the elasticity of the base part 2a as described above and can be stretched by a worker pulling the rubber part 2b in the pulling direction by about several millimeters to several centimeters. Pulling the end rubber 2 including the rubber part 2b in the longitudinal direction of the vehicle (the extending direction of the outside molding 1) stretches the rubber part 2b in the longitudinal direction by elastic deformation. At this time, the dividing parts 2c are separated from one another since the base part 2a are divided into the three dividing parts 2c. The separation allows the rubber part fixed to the base part 2a to be stretched without prevention by the base part 2a. In other words, in the outside molding 1 according to the present embodiment, the end rubber 2 can be stretched in the extending direction while the end rubber 2 includes the base part 2a, which has low elasticity and high rigidity and serves as a core material.

In FIG. 4, the base part 2a and the rubber part 2b are exploded, but practically the base part 2a and the rubber part 2b are integrated. The end rubber 2 including the base part 2a and the rubber part 2b is formed by two-color molding of resin materials, for example.

The endcap 3 includes a front-side endcap 3a and a rear-side endcap 3b as shown in FIG. 3. The front-side endcap 3a includes the cap 3a1, the base 3a2, and the lip 3a3. The cap 3a1 abuts against the front-side end surface (the end surface of the stainless steel cover 4) of the end rubber 2 from the front side to close the end surface. The base 3a2 is a bar-shaped portion connected to the back surface (the surface on the rear side) of the cap 3a1 substantially perpendicularly to the back surface. As described above, the outside molding 1 according to the present embodiment has the rear-side end, which is curved. The base 3a2 has a length allowing the base 3a2 to be positioned over whole area where the outside molding 1 is not curved (that is, an area where the outside molding 1 is substantially linear). The base 3a2 is formed with the cutouts 3a4. Into the cutouts 3a4, the projecting parts 2f provided on the base part 2a of the end rubber 2 described above are inserted.

Figure 8:
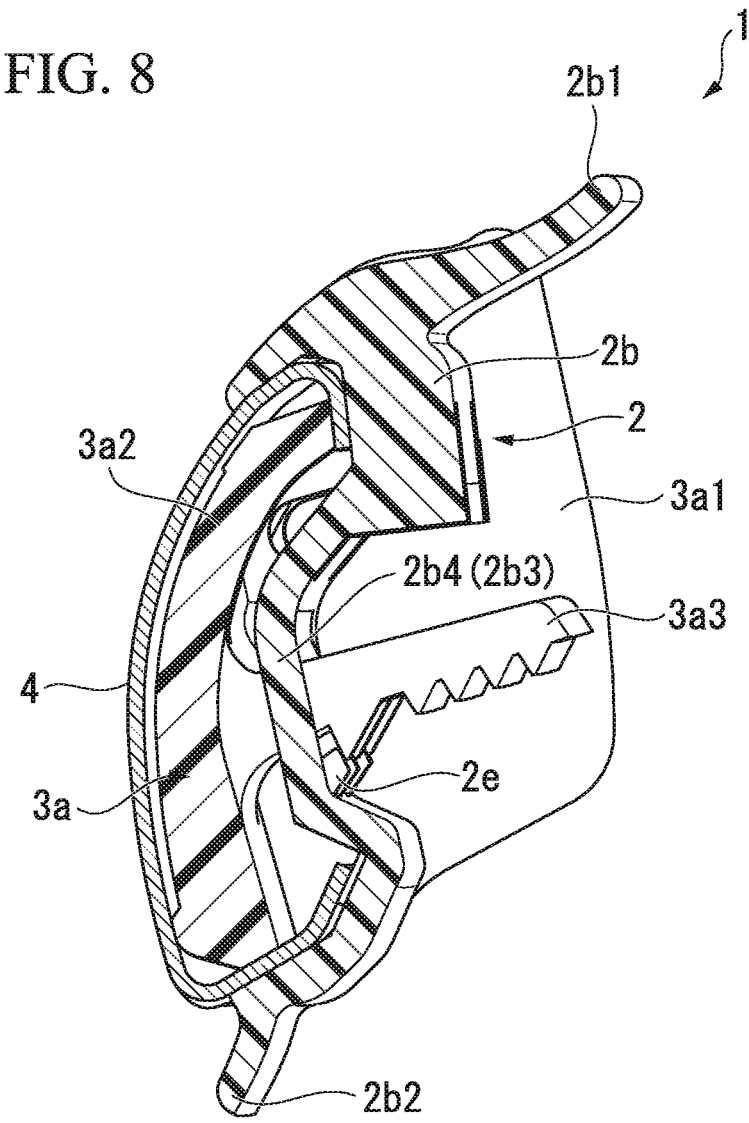
FIG. 8 is a sectional view along line A-A of FIG. 2.
Figure 9:
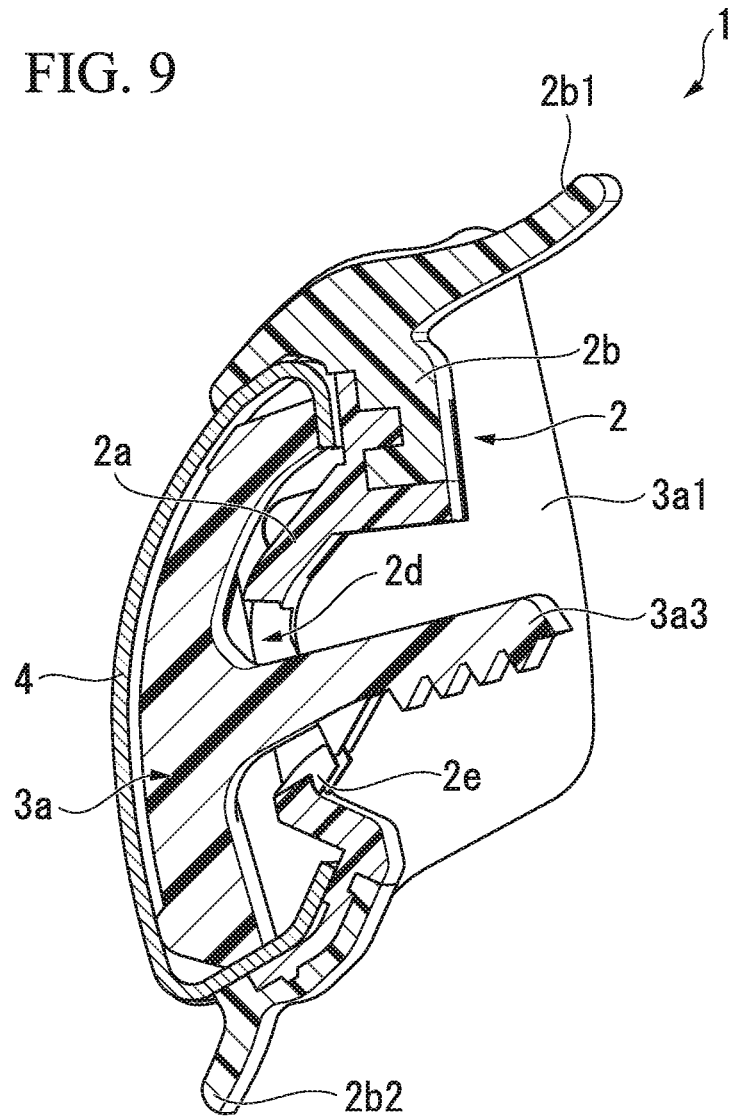
FIG. 9 is a sectional view along line B-B of FIG. 2.

The lip 3a3 is formed to project from the base 3a2 toward the inside of the vehicle and is provided in a plurality along the longitudinal direction of the base 3a2. FIG. 8 is a sectional view along line A-A of FIG. 2 and is a sectional view at a position passing through a portion where one of the stretching parts 2b3 is disposed. FIG. 9 is a sectional view along line B-B of FIG. 2. The line B-B is at a position that does not pass through the portions where the stretching parts 2b3 are disposed. As shown in FIGS. 8 and 9, the lower surfaces of the lips 3a3 are triangular-wave-shaped indented surfaces. The lips 3a3 pass through the openings 2d formed in the base part 2a and the tip sides of the lips 3a3 are inserted toward the inside of the vehicle as shown in FIG. 9. The lips 3a3 force the indented surfaces thereof to abut against the window frame 11 or the window pane 12 to prevent foreign substances from entering in a space between the window frame 11 and the outside molding 1 or a space between the window pane 12 and the outside molding 1.

The rear-side endcap 3b includes the cap 3b1, a base 3b2, and the lip 3b3. The cap 3b1 abuts against the rear-side end surface (the end surface of the stainless steel cover 4) of the end rubber 2 from the rear side to close the end surface. The base 3b2 is a bar-shaped portion curved along the rear-side end of the outside molding 1 (that is, a curved area) and is connected to the back surface of the cap 3b1 (the surface on the front side) substantially perpendicularly to the back surface.

The lip 3b3 is formed to project from the base 3b2 toward the inside of the vehicle and is provided in a plurality along the longitudinal direction of the base 3b2. The lower surfaces of the lips 3b3 are triangular-wave-shaped indented surfaces similarly to the lips 3a3 of the front-side endcap 3a. The lips 3b3 pass through the openings 2d formed in the base part 2a and the tip sides of the lips 3b3 are inserted toward the inside of the vehicle similarly to the lips 3a3. The lips 3b3 force the indented surfaces thereof to abut against the window frame 11 or the window pane 12 to prevent foreign substances from entering in a space between the window frame 11 and the outside molding 1 or a space between the window pane 12 and the outside molding 1.

As shown in FIG. 3, at the tip of the base 3a2 of the front-side endcap 3a, a projecting piece 3a5 projecting toward the rear side is formed. The projecting piece 3a5 is made to abut against the base 3b2 of the rear-side endcap 3b from the outside of the vehicle (the outer side in the radial direction of the base 3a2). The abutment of the projecting piece 3a5 against the base 3b2 connects the front-side endcap 3a and the rear-side endcap 3b slidably in the extending direction of the outside molding 1 (the longitudinal direction of the vehicle). This configuration allows adjustment of positions of the front-side endcap 3a and the rear-side endcap 3b in the extending direction of the outside molding 1 and then allows adjustment of the length of the endcap 3. Therefore, the cap 3a1 of the front-side endcap 3a can securely abut against the front-side end surface of the stainless steel cover 4. The cap 3b1 of the rear-side endcap 3b can also securely abut against the rear-side end surface of the stainless steel cover 4.

The stainless steel cover 4 is a stainless steel member covering the end rubber 2 and the endcap 3 from the outside of the vehicle and has a length that is substantially the same as the length of the end rubber 2. The stainless steel cover 4 has the upper end curved downward and the lower end curved upward as shown in FIG. 8 and FIG. 9. The upper edge of the stainless steel cover 4 is held between the end rubber 2 and the endcap 3 and the lower edge of the stainless steel cover 4 is locked with the claw parts 2e of the end rubber 2, so that the stainless steel cover 4 is fixed to the end rubber 2. In addition, the stainless steel cover 4 presses the endcap 3 from the outside of the vehicle. Thus, the endcap 3 is fixed to the end rubber 2.

In order to assemble the outside molding 1 according to the present embodiment, the endcap 3 is first put together with the stainless steel cover 4. At this time, the cap 3a1 of the front-side endcap 3a is made to abut against the front-side end surface of the stainless steel cover 4, and the cap 3b1 of the rear-side endcap 3b is made to abut against the rear-side end surface of the stainless steel cover 4. In the present embodiment, the tip of the base 3a2 of the front-side endcap 3a and the tip of the base 3b2 of the rear-side endcap 3b are made to abut against each other slidably in the longitudinal direction of the vehicle. The positions of the front-side endcap 3a and the rear-side endcap 3b in the extending direction of the outside molding 1 are adjustable. Thus, a gap is not generated between the cap 3a1 and the end surface of the stainless steel cover 4 or between the cap 3b1 and the end surface of the stainless steel cover 4. The absence of a gap allows the endcap 3 to be put together with the stainless steel cover 4.

Next, the endcap 3 having been put together with the stainless steel cover 4 is assembled with the end rubber 2. At this time, the lips 3*a*3 and the lips 3*b*3 of the endcap 3 are inserted through the openings 2*d* formed in the base part 2*a* of the end rubber 2 from the outside of the vehicle. In addition, the claw parts 2*e* of the base part 2*a* are locked with the lips 3*a*3 and the lips 3*b*3. Thus, the endcap 3 is fixed to the end rubber 2 (refer to FIG. 8 and FIG. 9). The stainless steel cover 4 is held between the endcap 3 and the end rubber 2. This configuration fixes the stainless steel cover 4 to the end rubber 2.

Upon assembly of the endcap 3 with the end rubber 2 as described above, the end rubber 2 is stretched when the end rubber 2 is shorter than the stainless steel cover 4. At this time, in the outside molding 1 according to the present embodiment, the base part 2*a* is divided into the plurality of dividing parts 2*c*, and the highly elastic rubber part 2*b* is connected to the base part 2*a* over the plurality of dividing parts 2*c*. Thus, the end rubber 2 can be easily stretched in the extending direction.

When the end rubber 2 is stretched, the rubber part 2*b* is elastically deformed. The elastic deformation generates restoring force to restore the end rubber 2 into the original shape. However, when the endcap 3 is assembled with the end rubber 2, the lock part 2*g* provided on the front-side part 2*c*1 of the base part 2*a* is locked with the lip 3*a*3 of the front-side endcap 3*a* from the front side as shown in FIG. 6. In addition, as shown in FIG. 7, the lock part 2*h* provided on the rear-side part 2*c*3 of the base part 2*a* is locked with the lip 3*b*3 of the rear-side endcap 3*b* from the rear side. Therefore, restoration of the end rubber 2 into the original shape by the restoring force is restrained, and the end surfaces of the end rubber 2 remains at the same positions as the end surfaces of the stainless steel cover 4 (that is, the positions where the end rubber 2 abuts against the cap 3*a*1 or the cap 3*b*1). As a result, a gap can be prevented from being formed between the cap 3*a*1 and the end surface of the end rubber 2 and between the cap 3*b*1 and the end surface of the end rubber 2.

According to the outside molding 1 of the present embodiment as described above, the end rubber 2 is connected to the base part 2*a* and the edge of the base part 2*a*, and the end rubber 2 includes the rubber part 2*b* having higher elasticity than the elasticity of the base part 2*a*. The end rubber 2 has a configuration, in which the base part 2*a* having lower elasticity than the elasticity of the rubber part 2*b* serves as a core material, and the rubber part 2*b* having higher elasticity is attached to the edge of the core material. In addition, in the outside molding 1 according to the present embodiment, the base part 2*a*, which serves as the core material, is composed of the plurality of dividing parts 2*c*, which are separated from one another and arranged in the extending direction of the end rubber 2. Because of this configuration, stretching the rubber part 2*b* by pulling it separates the dividing parts 2*c*, which compose the base part 2*a*, from one another. Thus, the length of the end rubber 2 can be adjusted. As a result, according to the outside molding 1 of the present embodiment, the length of the end rubber 2 can be adjusted such that no gap is formed between the end rubber 2 and the endcap 3. Consequently, according to the outside molding 1 of the present embodiment, generation of a gap between the endcap 3 and the end rubber 2 can be prevented.

In addition, the outside molding 1 of the present embodiment includes the stretching parts 2*b*3 between the dividing parts 2*c*, and the stretching parts 2*b*3 is fixed to the ends of the dividing parts 2*c* and are formed from a material having higher elasticity than the elasticity of the base part 2*a*. This configuration allows prevention of a space from being formed between the dividing parts 2*c* even when the end rubber 2 is stretched. Consequently, according to the outside molding 1 of the present embodiment, the rigidity of the end rubber 2 can be prevented from being lowered even when the end rubber 2 is stretched.

In addition, in the outside molding 1 of the present embodiment, the stretching parts 2*b*3 are formed from the same material as the material of the upper lips 2*b*1 and the lower lips 2*b*2, and the stretching parts 2*b*3 are provided integrally with the upper lips 2*b*1 and the lower lips 2*b*2. Consequently, the rubber part 2*b* can be integrally formed by resin molding, and the rubber part 2*b* can be easily manufactured.

In addition, in the outside molding 1 of the present embodiment, the base part 2*a* includes the lock part 2*g* positioned closer to the front-side end of the end rubber 2 than the front-side stretching part 2*b*4 and the lock part 2*h* positioned closer to the rear-side end of the end rubber 2 than the rear-side stretching part 2*b*5. Thus, it is possible to prevent the stretched end rubber 2 from contracting by the restoring force and then to keep the end rubber 2 and the endcap 3 abutting against each other.

Since the end rubber 2 is configured to be stretchable in the extending direction, formation of a gap between the cap 3*a*1 and the end rubber 2 and between the cap 3*b*1 and the end rubber 2 can be securely prevented. However, the cap 3*a*1 and the cap 3*b*1 abut against the end surface of the end rubber 2. The abutment causes a gap between the cap 3*a*1 and the end surface of the stainless steel cover 4 and a gap between the cap 3*b*1 and the end surface of the stainless steel cover 4 to be formed when the length of the end rubber 2 before stretching is larger than the length of the stainless steel cover 4. Therefore, the length of the end rubber 2 in design, that is, the length before stretching is desirably set smaller than the length of the stainless steel cover 4 so that the end rubber 2 has a length that is the same as the length of the stainless steel cover 4 even when the dimensional error is the maximum in an estimated range.

In addition, the end rubber 2 should be configured to allow the lips 3*a*3 and the lips 3*b*3 of the endcap 3 to be inserted into the openings 2*d* of the base part 2*a* when the end rubber 2 is stretched. Therefore, the opening width of the openings 2*d* is set to be larger than the width of the lips 3*a*3 and the lips 3*b*3 so that the lips 3*a*3 and the lips 3*b*3 can be inserted even when the dimensional error is the maximum in the estimated range.

The preferred embodiment of the present invention has been described with reference to the accompanying drawings, but the present invention is not limited to the embodiment. The shapes, combinations, and the like of the respective components described in the above-described embodiment are merely examples and they can be variously changed based on a requirement of design within the scope not departing from the spirit of the present invention.

For example, in the above-described embodiment, a configuration including the stainless steel cover 4 has been described. However, the present invention is not limited to this configuration and the present invention can be applied to a molding that does not include the stainless steel cover 4. In addition, a molding is not limited to the outside molding 1.

In the above-described embodiment, the configuration, in which the base part 2*a* is divided into the three dividing parts 2*c*, has been described. However, the present invention is not limited to this configuration, and a configuration that includes a base part composed of two, four, or more than four parts can be employed.

The present invention is not limited by the above description but is limited only by the scope of the accompanying claims.

The invention claimed is:

1. A molding comprising:
    a long molding body; and
    an endcap closing an end surface of the molding body, wherein
    the molding body includes:
        a base part composed of a plurality of dividing parts that are separated from one another and arranged in an extending direction of the molding body; and
        an edge part having higher elasticity than the elasticity of the base part and connected to an edge of the base part over the plurality of the dividing parts,
    wherein the molding further comprises a stretching part between the dividing parts, the stretching part being fixed to ends of the dividing parts and being formed from a material having a higher elasticity than the elasticity of the base part, and
    wherein the base part includes a lock part that is at a position closer to an end of the molding body than the stretching part.

2. The molding according to claim 1, wherein the stretching part is formed from a same material as a material of the edge part and is provided integrally with the edge part.

3. The molding according to claim 1, wherein the lock part is fastened to the endcap.

4. The molding according to claim 2, wherein the lock part is fastened to the endcap.

* * * * *